(12) United States Patent
Warren et al.

(10) Patent No.: US 10,037,666 B2
(45) Date of Patent: *Jul. 31, 2018

(54) SMART WAKE

(71) Applicant: Vivint, Inc., Provo, UT (US)

(72) Inventors: Jeremy B. Warren, Draper, UT (US);
Matthew J. Eyring, Provo, UT (US);
James E. Nye, Alpine, UT (US)

(73) Assignee: Vivint, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,922

(22) Filed: May 15, 2017

(65) Prior Publication Data

US 2017/0316667 A1 Nov. 2, 2017

Related U.S. Application Data

(63) Continuation of application No. 14/680,770, filed on Apr. 7, 2015, now Pat. No. 9,652,959.

(51) Int. Cl.
| | |
|---|---|
| *G08B 23/00* | (2006.01) |
| *G08B 19/00* | (2006.01) |
| *G08B 25/14* | (2006.01) |
| *H04L 12/64* | (2006.01) |
| *H04L 12/28* | (2006.01) |
| *G08B 25/00* | (2006.01) |

(52) U.S. Cl.
CPC ............ *G08B 19/00* (2013.01); *G08B 25/14* (2013.01); *H04L 12/28* (2013.01); *H04L 12/6418* (2013.01); *G08B 25/008* (2013.01)

(58) Field of Classification Search
CPC ......... G08B 19/00; G08B 25/14; H04L 12/28; H04L 12/6418
USPC ......................................................... 340/575
See application file for complete search history.

(56) References Cited

U.S. PATENT DOCUMENTS

| | | | |
|---|---|---|---|
| 6,381,580 B1 * | 4/2002 | Levinson | G06Q 10/06311 |
| | | | 705/7.13 |
| 7,002,463 B2 | 2/2006 | Wakabayashi | |
| 7,956,755 B2 | 6/2011 | Lee et al. | |
| 8,065,079 B2 | 11/2011 | Rogers | |
| 9,241,270 B1 * | 1/2016 | Logue | H04W 12/06 |
| 9,652,959 B2 * | 5/2017 | Warren | G08B 19/00 |
| 2005/0137465 A1 | 6/2005 | Cuddihy et al. | |
| 2012/0053472 A1 | 3/2012 | Tran | |
| 2013/0178986 A1 | 7/2013 | Lombard et al. | |
| 2013/0226316 A1 | 8/2013 | Duchene et al. | |
| 2014/0152188 A1 | 6/2014 | Bora et al. | |

OTHER PUBLICATIONS

Withings Aura, obtained from http://www.withings.com/eu/withings-aura.html#, on Mar. 2, 2015.

\* cited by examiner

*Primary Examiner* — Kerri McNally
(74) *Attorney, Agent, or Firm* — Holland & Hart LLP

(57) ABSTRACT

Methods and systems for security and/or automation systems are described. In some embodiments, the methods may include identifying an area of a premises associated with an occupant, identifying a wake up time associated with the occupant, identifying a location associated with the occupant, and initiating one or more automated actions based at least in part on the wake up time and the area.

20 Claims, 8 Drawing Sheets

SMART WAKE

CROSS REFERENCE

This application is a continuation of U.S. patent application Ser. No. 14/680,770 entitled "SMART WAKE," which was filed 7 Apr. 2015, which is assigned to the assignee hereof. The disclosure of which is incorporated by reference herein in its entirety.

BACKGROUND

The present disclosure, for example, relates to security and/or automation systems. Security and automation systems are widely deployed to provide various types of communication and functional features such as monitoring, communication, notification, and/or others. These systems may be capable of supporting communication with a user through a communication connection or a system management action.

Automation systems enable certain functions relating to actions and events regarding lighting, climate control, security, etc. Such automation systems, however, may leave an occupant uninformed regarding the status of elements of the automation system and/or other occupants at predetermined times of day and lack additional features that are desirable by users.

SUMMARY

The disclosure herein includes methods and systems for improving the monitoring of several aspects of a premises in a morning or other time of the day routine and keeping one or more occupants apprised of the status of other occupants and/or one or more elements of the automated system at one or more designated times of the day, including in the morning. As one example, the system may inform a parent regarding the status of each child such as whether they are awake, whether they have eaten breakfast, whether they have showered, whether they are dressed for the day, their current location in the premises, their progress in a morning routine, their estimated ready-for-departure time, etc.

A method for security and/or automation systems is described. In some embodiments, the method may include identifying an area of a premises associated with an occupant, identifying a wake up time associated with the occupant, identifying a location associated with the occupant, and initiating one or more automated actions based at least in part on the wake up time and the area.

In some embodiments, the one or more automated actions may include adjusting a light in the area at least once based at least in part on the wake up time and/or playing an audio signal at least once based at least in part on the wake up time. In some cases, the method may include monitoring an aspect of the occupant. The monitoring may include monitoring at least one of a heart rate, or a respiratory rate, or a body temperature, or a rate of movement, or an audible sound, or a bed use status, or a combination thereof, and/or other characteristics. In some embodiments, based at least in part on the monitoring, the method may include determining a level of wakefulness of the occupant, determining an occupancy of the premises, determining a likelihood that the occupant is sick, and/or adjusting an environmental setting of the premises.

In some embodiments, the method may include identifying a potential delay associated with the occupant relative to the wake up time and sending a notification based at least in part on the potential delay. In some cases, the method may include identifying a position of the occupant relative to the area in relation to the wake up time and adjusting a light based at least in part on a detected light level and the location. In some embodiments, the method may include determining whether the occupant performs one or more tasks and sending a notification based at least in part on the determining.

An apparatus for security and/or automation systems is also described. In some embodiments, the apparatus may include a processor, memory in electronic communication with the processor, and instructions stored in the memory, the instructions being executable by the processor to perform the steps of identifying an area of a premises associated with an occupant, identifying a wake up time associated with the occupant, identifying a location associated with the occupant; and initiating one or more automated actions based at least in part on the wake up time and the area.

A non-transitory computer-readable medium is also described. The non-transitory computer readable medium may store computer-executable code, the code being executable by a processor to perform the steps of identifying an area of a premises associated with an occupant, identifying a wake up time associated with the occupant, identifying a location associated with the occupant, and initiating one or more automated actions based at least in part on the wake up time and the area.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
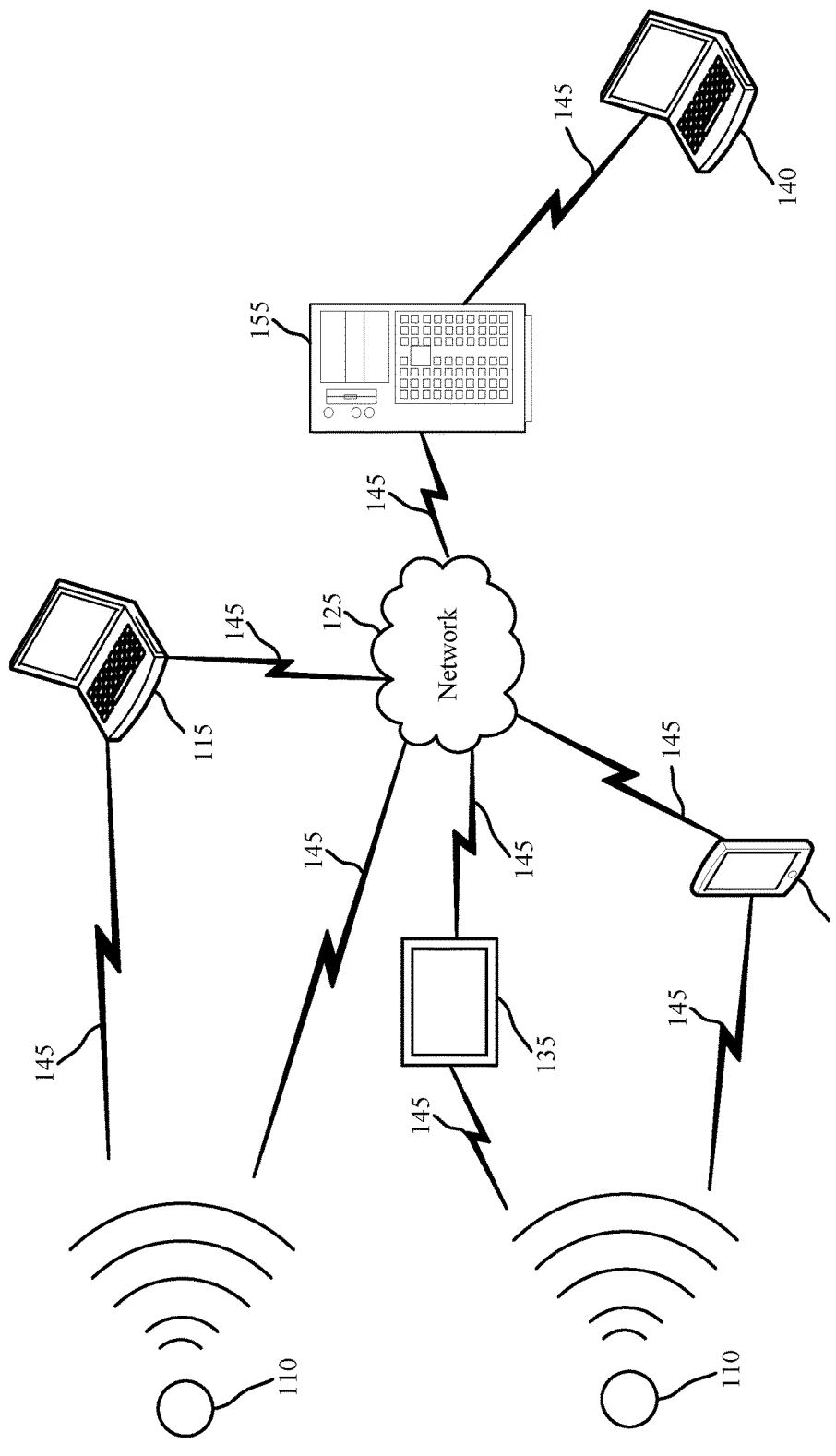
FIG. 1 is a block diagram of an example of a security and/or automation system in accordance with various embodiments.

The following relates generally to automation and/or security systems. Automation systems may include one or more sensors located outside and/or inside a premises. A premises such as a home or business may employ automation and/or security systems to automate and secure an area of the premises.

An occupant may use an electronic device, such as a mobile device, to monitor a home or a business. At certain time of a day, including the beginning of a day, however, an occupant of a home may have to walk to several locations of the home to make sure other occupants, such as children, spouse, elderly parent, pet, etc. are waking up, that the home is secure, that certain lights are turned off and others turned on, that a heating ventilation air conditioning (HVAC) system is configured and/or operating properly, etc. Likewise, an occupant may have to go over a checklist and walk to several locations of the home to make sure doors are closed, locks are locked, windows shut, lights turned on and/or off, security system armed, etc. Such routines may cause an occupant to spend a considerable amount of time in an on-going morning routine or may mean that certain items are not performed because of time constraints.

Aspects of the present systems and methods relate to systems, methods, and related devices for premises security and occupant monitoring in conjunction with automation systems. The systems and methods may be configured to inform occupants regarding the status of a premises. For example, the systems and methods may inform parents regarding the status of their children and home security at a designated time, such as the morning. The systems and methods may enable parents to keep track of a child's progress in a morning routine such as waking up, getting out of bed, cleaning a room, taking a shower, eating breakfast, collecting a school bag, feeding a pet, etc. The systems and methods may monitor the status of security and automation systems, such as the status of entrance doors, windows, gates, garage doors, etc., as well as appliances and other devices associated with the premises. Thus, the systems and methods may help with a morning routine and secure the home when the occupants leave for the day with minimal occupant input.

In some embodiments, a home automation system may learn patterns of sleep and/or occupancy for one or more occupants of a premises. The home automation system may employ one or more sensors. For example, sensors located at an entrance may include an image sensor (still and/or video), an infrared sensor, a motion sensor, a proximity sensor, identification reader, an audio sensor, and/or other sensor. Sensors located within the premises may include a sleep sensor, an image sensor, a motion sensor, a proximity sensor, identification reader, an audio sensor, and/or the like, among others. The systems and methods may include determining the location of each occupant of a premises at a given time, during a given time period, over multiple time periods, and/or based on other characteristics.

At one or more designated times (e.g., a time each morning, a time each afternoon), the system may determine whether occupants are asleep in bed, awake in bed, whether occupants left a bed but are now back in a bed, out of bed, in the bathroom, in the kitchen, etc. The system may play a wake-up alarm for one or more occupants. Each occupant may be assigned a unique alarm with a particular wake up time, alarm characteristics, alarm features, etc. In some embodiments, the system alarm may be based on one or more alarms associated with an electronic device (e.g., a smart phone, a tablet, a wearable device). For example, a first occupant may program an alarm in his/her smart phone for 6:00 A.M. A second occupant may program an alarm in his/her smart phone for 7:00 A.M. The system may identify the alarms set in the smart phones to configure alarms for the system.

The system may also, additionally and/or alternatively, activate an alarm based on additional input such as an administrators instruction, a voice command by the relevant occupant or another occupant, based on a calendar schedule (e.g., having an early meeting), based on previous patterns and time requirements for waking up, and/or based on calculations of one or more activities to be performed relating to a desired time to leave the premises. The triggering of one of the alarms in the morning may trigger one or more actions by the system.

For example, the triggering of the first alarm may disarm at least in part a security system of the premises, turn on/off a light, adjust a temperature on the thermostat, turn on/off an appliance, etc. In some embodiments, the system may perform one or more actions after, at the same time, and/or before the alarm of the electronic device. For example, the system may turn on a light or a shower two minutes before the scheduled alarm of the smart device. Or, the system may perform one or more actions at the same time as the alarm of the electronic device for a user that has difficulty arising from sleeping overnight or during a nap.

In some embodiments, the alarm may include an audio signal played over a speaker (e.g., speaker of a control panel, wall-mounted speaker, ceiling-mounted speaker, speaker of a smartphone and/or other computing device, etc.). The audio signal may include a tone, a song, a recording of any type, and/or a computer text-to-voice audio signal to wake the occupant.

The alarm features may include, but are not limited to, adjusting a light such as turning on a light, adjusting a brightness level of a light (e.g., gradually increasing the brightness level), turning on a shower, adjusting a temperature of a shower, turning on an exhaust fan in the bathroom, turning on a heating lamp in the bathroom, turning on a curling iron or a flat iron, activating a coffee maker, unlocking a pet door, dispensing food in an automated feeder for a pet, tuning to a radio station, starting a playlist, and/or activating one or more speakers based on the user's detected location, etc. The alarm features may include a vibration device to vibrate a mattress.

In some embodiments, the features of the alarm for a particular occupant may be isolated to a particular area and/or room of the premises. Thus, if a first occupant has an alarm for 5:00 A.M. and a second occupant has an alarm for 6:00 A.M., the system may isolate the alarm features of the first alarm to the location of the first occupant so as not to disturb the second occupant.

The system may generate a notification indicating a particular occupant is still in bed after an alarm has been activated. For example, the notification may state in text and/or audio, "Tommy has slept past his alarm. The alarm played 1 minute ago." The notification may include a prompt that allows the recipient of the notification to activate another alarm. In some cases, the notification may be received on a smartphone and the notification may enable the recipient to communicate in real-time over a wireless and/or Internet intercom system.

In some embodiments, a notification may include pre-programmed characteristics and functions. In some embodiments, a notification may be based at least in part (or in full) on input from one or more occupants. For example, an occupant may set up their notification alerts based on a certain time period in association with an alarm time, customize notifications relating to one or more other individuals (more frequent notifications for user A than for user B, more urgent notifications based on the current time relative to an alarm time and/or a progression within a routine, etc.).

For example, a first occupant may include an alarm with one snooze allowed. A second occupant may include an alarm with no snoozes allowed and one or more reminders delivered based on a current time and/or a detected progress of the second occupant. For instance, 10 minutes after the alarm, the system may notify the second occupant that he has a business meeting that morning and to wear a suit and tie instead of his usual uniform, etc.

For example, the parent may receive the notification on his or her phone and the notification may link the phone's audio system with the audio system in the home. In some embodiments, this linking may occur via Bluetooth, Z-Wave, Wi-Fi, and/or another method. Thus, the parent may speak to the phone and the system may relay this audio signal to the audio system of the home. In some cases, the system may relay the audio signal to at least one speaker in particular such as a speaker in or near the room of the child that has slept in past his or her wake time, thus isolating the relayed audio signal to the particular occupant.

In some cases, the system may relay the audio signal to a smartphone or computing device associated with the child. In some embodiments, the relayed audio signal may include text-to-voice, a voice recording message, a text message, an automated phone call, certain other audio, and/or a message requesting the parent select an action, etc.

The system may assist a parent of a premises in the daily morning routine by providing a morning summary notification. The summary notification may be based on the status of one or more automation systems, tracking systems, and/or security systems associated with the premises and/or its occupants. Thus, the summary notification may include a security system status, an automation system status, an occupancy status, an appliance status, a climate control status, a vehicle status, and the like. The summary notification may appear as a single page of textual and graphical information indicating the status of each monitored system and/or may only include an update for systems, devices, and/or people that require attention. Thus, with a glance at the summary notification, a parent may see whether a child is still sleeping, where a child is in their morning routine (e.g., cleaned room, showered, ate breakfast, brushed teeth, etc.), whether a light has been left on, whether all locks are secure, whether a door is left unlocked, whether a window is left open, etc.

Additionally, or alternatively, the summary notification may indicate whether a media device such as television, stereo, etc. is on, whether a computing device is on, whether an appliance such as a furnace, air conditioner, refrigerator, oven, etc., is functioning properly or needs servicing, whether a vehicle is locked, whether a door on the vehicle is left open, whether a dome light in the vehicle is left on, and the like. In some cases, the summary notification may include a prompt for the recipient to respond to predefined irregularities such as a prompt to lock a door left unlocked, whether to send a message to a child still outside the premises (e.g., that didn't come home the night before), whether to schedule a service call for an appliance that needs servicing, etc.

In some cases, the system may monitor a sleep parameter while the child is sleeping. A sleep sensor may indicate that the child is awake, asleep, is restless, has erratic breathing, has made audible noises, has moved to a bathroom some number of times, has exhibited characteristics of being sick, has an increased heart rate, has an increased temperature, etc.

Upon detecting a sleep irregularity, such as high temperature, restlessness, erratic breathing, or the child not being asleep by a predetermined time (e.g., via a configured time and/or a time learned by the system by monitoring and pattern detection), a notification may be generated and sent to another occupant of the premises such as a parent. In some cases, the summary notification may indicate that a child was not in his or her bedroom by a designated time, whether a child returned home after the parent went to sleep, the child's location at and/or after the designated time, etc.

FIG. 1 is an example of a communications system 100 in accordance with various aspects of the disclosure. In some embodiments, the communications system 100 may include one or more sensor units 110, local computing device 115, 120, network 125, server 155, control panel 135, and remote computing device 140. One or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 155. In alternate embodiments, the network 125 may be integrated with any one of the local computing device 115, 120, server 155, and/or remote computing device 140, such that separate components are not required.

Local computing device 115, 120 and remote computing device 140 may be custom computing entities configured to interact with sensor units 110 via network 125, and in some embodiments, via server 155. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an IPOD®, an IPAD®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 155, and network 125.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some embodiments, the one or more sensor units 110 may be sensors configured to conduct periodic or ongoing automatic measurements related to occupant status, performance of one or more systems, and/or location data signals. Each sensor unit 110 may be capable of sensing multiple occupant statuses and/or location parameters, or alternatively, separate sensor units 110 may monitor separate occupant status and location parameters. For example, one sensor unit 110 may monitor occupant status (e.g., in bed, out of bed, showered, dressed, breakfast eaten, etc.), while another sensor unit 110 (or, in some embodiments, the same sensor unit 110) may detect occupant location (e.g., in bedroom, in kitchen, in bathroom, in family room, etc.). In some embodiments, one or more sensor units 110 may additionally monitor alternate occupant status and/or location parameters, such as occupant heart rate, respiratory rate, temperature, etc. In some embodiments, sensor units 110 may monitor one or more system performance parameters, including but not limited to security system lockdown, alarm status, automated device status, interaction with one or more occupants with a security and/or an automation system.

Data gathered by the one or more sensor units 110 may be communicated to local computing device 115, 120, which may be, in some embodiments, a thermostat or other wall-mounted input/output smart home display, among other things. In other embodiments, local computing device 115, 120 may be a personal computer and/or smart phone. Where local computing device 115, 120 is a smart phone, the smart phone may have a dedicated application directed to collecting audio and/or video data and calculating object detection therefrom. The local computing device 115, 120 may process the data received from the one or more sensor units 110 to obtain a probability of an object within an area of a premises such as an object within a predetermined distance of an entrance to the premises as one example. In alternate embodiments, remote computing device 140 may process the data received from the one or more sensor units 110, via network 125 and server 155, to obtain a probability of detecting an object within the vicinity of an area of a premises, such as detecting a person at an entrance to the premises for example. Data transmission may occur via, for example, frequencies appropriate for a personal area network (such as BLUETOOTH® or IR communications) or local or wide area network frequencies such as radio frequencies specified by the IEEE 802.15.4 standard, among others.

In some embodiments, local computing device 115, 120 may communicate with remote computing device 140 or control panel 135 via network 125 and server 155. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 155 may be configured to communicate with the sensor units 110, the local computing devices 115, 120, the remote computing device 140 and control panel 135. The server 155 may perform additional processing on signals received from the sensor units 110 or local computing devices 115, 120, or may simply forward the received information to the remote computing device 140 and control panel 135.

Server 155 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 155 may receive a stream of occupant status, system performance, and/or location information from a sensor unit 110, a stream of occupant status, system performance, and/or location information from the same or a different sensor unit 110, a stream of occupant status data from either the same or yet another sensor unit 110, and/or a stream of occupant location from either the same or yet another sensor unit 110, among other things.

In some embodiments, server 155 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 155. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 155 may include a database (e.g., in memory and/or through a wired and/or a wireless connection) containing audio and/or video data received from the sensor units 110 and/or the local computing devices 115, 120. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

Figure 2:
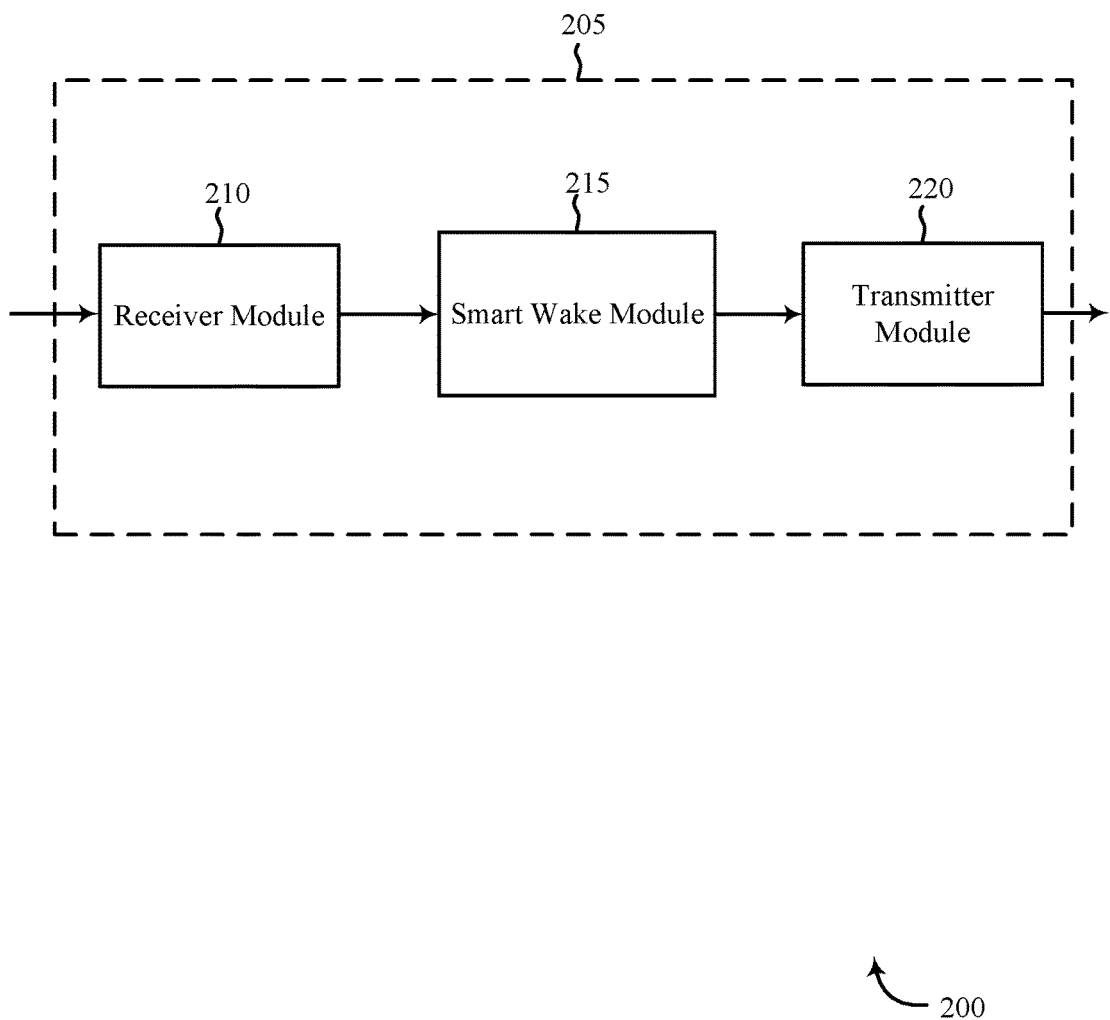
FIG. 2 shows a block diagram of a device relating to a security and/or an automation system, in accordance with various aspects of this disclosure.

FIG. 2 shows a block diagram 200 of an apparatus 205 for use in electronic communication, in accordance with various aspects of this disclosure. The apparatus 205 may be an example of one or more aspects of a control panel 135 described with reference to FIG. 1, an electronic device 115 such as a laptop, and/or an electronic device 120 such as a smart phone or a tablet computer. The apparatus 205 may include a receiver module 210, a smart wake module 215, and/or a transmitter module 220. The apparatus 205 may also be or include a processor. Each of these modules may be in communication with each other and/or other modules—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive occupant status signals and/or data (e.g., occupant is awake, in/out of bed, showered, dressed, eaten breakfast, etc.) and/or occupant location signals and/or data (e.g., occupant is in his/her bedroom, in the kitchen, in the bathroom, etc.). Information may be passed on to the smart wake module 215, and to other components of the apparatus 205.

The smart wake module 215 may be configured to enable occupants to keep track in the progress of a routine, such as a morning routine and/or a routine after a nap, and/or a routine after a period of sickness or otherwise diminished activity. In some embodiments, a user may request that the system perform one or more actions to effectively help the user prepare after a certain period. For example, if a user has been sick until 3 P.M., the occupant can request that the system and/or methods perform operations to help the user prepare for the rest of the day. For example, the smart wake module 215 may monitor a location of an occupant in relation to one or more predetermined times.

In some cases, smart wake module 215 may monitor an occupant's progress in a morning routine and/or send a notification regarding the state of an occupant and/or system of the premises in relation to a morning routine. In some cases, the smart wake module 215 may monitor a location of the occupant at a preset morning alarm time, a preset breakfast time, a preset shower time, a preset departure time, etc.

The transmitter module 220 may transmit the one or more signals received from other components of the apparatus 205. The transmitter module 220 may transmit occupant status signals and/or data (e.g., occupant is awake, in/out of bed, showered, dressed, eaten breakfast, etc.) and/or occupant location signals and/or data (e.g., occupant is in his/her bedroom, in the kitchen, in the bathroom, has traveled from the bedroom to a garage to a pet area, etc.). In some cases, transmitter module 220 may transmit results of data analysis on occupant status/location signals and/or data analyzed by smart wake module 215. In some examples, the transmitter module 220 may be collocated with the receiver module 210 in a transceiver module. In other examples, these elements may not be collocated.

Figure 3:
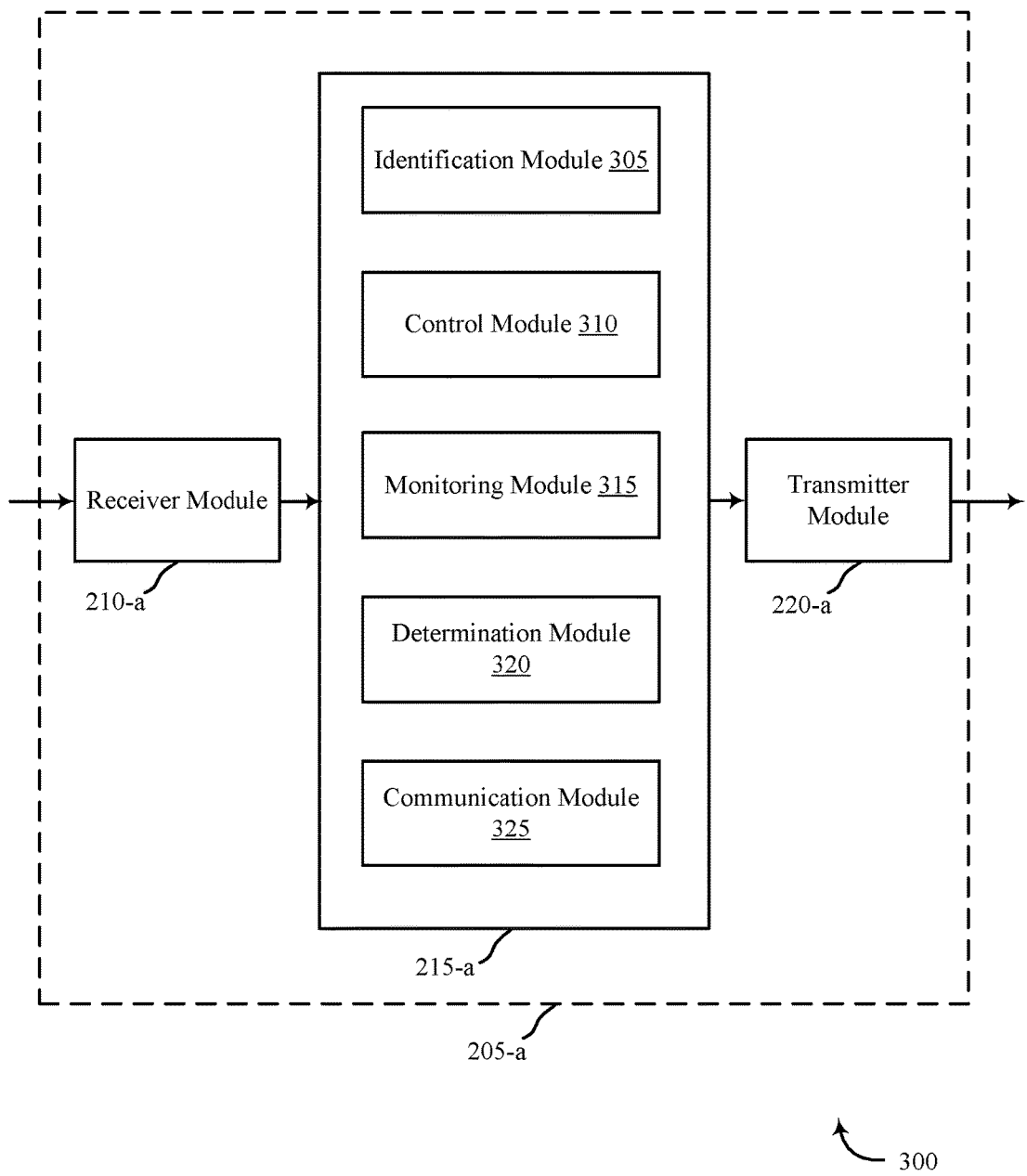
FIG. 3 shows a block diagram of a device relating to a security and/or an automation system, in accordance with various aspects of this disclosure.

FIG. 3 shows a block diagram 300 of an apparatus 205-*a* for use in wireless communication, in accordance with various examples. The apparatus 205-*a* may be an example of one or more aspects of a control panel 135 described with reference to FIG. 1. It may also be an example of an apparatus 205 described with reference to FIG. 2. The apparatus 205-*a* may include a receiver module 210-*a*, a smart wake module 215-*a*, and/or a transmitter module 220-*a*, which may be examples of the corresponding modules of apparatus 205. The apparatus 205-*a* may also include a processor. Each of these components may be in communication with each other. The smart wake module 215-*a* may include identification module 305, control module 310, monitoring module 315, determination module 320, and/or communication module 325. The receiver module 210-*a* and the transmitter module 220-*a* may perform the functions of the receiver module 210 and the transmitter module 220, of FIG. 2, respectively.

The components of the apparatus 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In some embodiments, identification module 305 may identify an area of a premises associated with an occupant. For example, identification module 305 may identify a bedroom associated with the occupant. For example, identification module 305 may identify other areas associated with the occupant, including an entertainment room, a kitchen, a particular bathroom. For example, identification module 305 may identify other areas associated that may not normally be associated with the occupant, including an outside shed, a study/office area, another occupant's bedroom, etc. In some cases, identification module 305 may identify a wake up time associated with the occupant.

In some cases, identification module 305 may identify a location associated with the occupant, including a current location, a past location, and/or trends or patterns relating to an occupant. In some embodiments, identification module 305 may identify a pattern associated with the occupant. For example, identification module 305 may determine that the occupant is typically asleep in his/her room by 11:00 P.M., that an alarm of 6:00 A.M. is preset for the occupant, and that the occupant typically wakes up with the alarm at 6:00 A.M. Control module 310 may initiate one or more automated actions based at least in part on the wake up time and the area associated with the occupant.

In some cases, the one or more automated actions include control module 310 adjusting a light in the area at least once based at least in part on the wake up time. For example, control module 310 may turn on a light in the bedroom where the occupant is sleeping at the designated time (e.g., 6:00 A.M.). In some cases, control module 310 may turn the light on at a first brightness level in relation to the designated time (e.g., before, at, or after the designated time). After a predetermined time period lapses, control module 310 may adjust the brightness level.

For example, control module 310 may first turn a light on at a first brightness level one minute before the wake up time. After 10 seconds lapses, as another example, control module 310 may increase the brightness level to a second brightness level. In some embodiments, control module 310 may continue to increase the brightness level at predetermined intervals until the occupant snoozes or turns the alarm off and/or until reaching a maximum brightness.

In some cases, the one or more automated actions include control module 310 adjusting an audio signal in the area at least once based at least in part on the wake up time. For example, control module 310 may turn on an audio speaker in the bedroom where the occupant is sleeping at the designated time (e.g., 6:00 A.M.). In some cases, control module 310 may turn the audio speaker at a first volume level in relation to the designated time (e.g., before, at, or after the designated time). After a predetermined time period lapses, control module 310 may adjust the volume level.

For example, control module 310 may first turn an audio speaker on at a first volume level one minute before the wake up time. After 10 seconds lapses, as another example, control module 310 may increase the volume level to a second volume level. In some embodiments, control module 310 may continue to increase the volume level at predetermined intervals until the occupant snoozes or turns the alarm off and/or until reaching a maximum volume level.

In some embodiments, an automation system in conjunction with the smart wake module 215-*a*, may store a unique alarm for each occupant of the premises. The system alarm may be based on one or more alarms associated with a smart phone. For example, a first occupant may program an alarm in his/her smart phone for 6:00 A.M. A second occupant may program an alarm in his/her smart phone for 7:00 A.M. In some cases, the occupants may program the alarms using an application linked with the automation system. Additionally, or alternatively, the occupants may use a native alarm application to program his/her alarm. The system may identify the alarms set in the smart phones to configure alarms for the automation system. Accordingly, the triggering of an alarm in the morning may trigger one or more actions such as disarming at least in part a security system of the premises, turning on/off a light, adjusting a temperature on the thermostat, turning on/off an appliance, etc.

In some embodiments, monitoring module 315 may monitor an aspect of the occupant within the area. In some cases, the monitoring may include monitoring at least one of a heart rate, or a respiratory rate, or a body temperature, or a rate of movement, or an audible sound, a bed use status (e.g., currently in bed, not currently in bed, etc.), or a combination thereof. This monitoring may occur using sensors based on contact, visual monitoring, audible monitoring, video monitoring, some combination, and/or others. In some embodiments, identification module 305 may identify a potential delay associated with the occupant relative to the wake up time.

For example, identification module 305 may identify the occupant still in his/her bed after the wake up time. Additionally, or alternatively, identification module 305 may identify the occupant behind schedule relative to one or more morning tasks such as making his/her bed, eating breakfast, showering, getting dressed, practicing a musical instrument, etc. In some cases, communication module 325 may send a notification based at least in part on the potential delay.

In some embodiments, determination module 320 may determine a level of wakefulness of the occupant based at least in part on the monitoring performed by monitoring module 315. The determination module 320 may determine the level of wakefulness based on the occupant's heart rate, respiratory rate, body temperature, rate of movement, movement from and/or between one or more areas, actions performed, actions omitted or not performed, differences of actions and patterns often performed, audible noises, activity on or relating to an electronic device, etc. If the determination module 320 determines the occupant is in a deep sleep state before, at, or after the wake up time, communication module 325 may send a notification to another occupant. For example, when determination module 320 determines a child is in a deeper sleep state than usual at the wake up time, communication module 325 may send a notification to a parent. The notification may ask the parent whether to maintain and/or to modify the wake up time. For example, the notification may enable the parent to snooze the wake up time for the child by a set time such as 10 minutes, allowing the child to get more deep, regenerative sleep.

In some embodiments, determination module 320 may automatically determine that a sleep time should be adjusted based on one or more data types examined. For example, if determination module 320 determines that a child was sick and awake for a predetermined amount of time, determination module 320 may automatically adjust, cancel, postpone, and/or perform some other operation relating to the wake up time.

In some embodiments, determination module 320 may determine an occupancy of the premises based at least in part on the monitoring. For example, using bed and sleep state data, the determination module 320 may detect when the premises is occupied or unoccupied and automatically adjust home security and/or automation devices accordingly. In some cases, determination module 320 may determine a likelihood that the occupant is sick based at least in part on the monitoring. For example, determination module 320 may determine that an occupant's restlessness, heart rate, respiratory rate, body temperature, etc., indicates that the occupant is sick. Communication module 325 may send a notification upon communication module 320 determining the occupant is likely sick. For example, upon determination module 320 determining a child is sick, communication module 325 may send a notification to a parent informing the parent regarding the likelihood.

In some embodiments, control module 310 may adjust an environmental setting of the premises based at least in part on the monitoring performed by monitoring module 315. For example, upon determining an apparent temperature associated with the occupant's bedroom fails to satisfy a preconfigured temperature range of comfort, the control module 310 may adjust the HVAC system accordingly. At, before, or after the wake up time, control module 310 may adjust the HVAC system to exceed the preconfigured temperature range of comfort. For example, if the preconfigured temperature range of comfort is from 68 degrees Fahrenheit (F) to 70 F, then control module 310 may allow the apparent temperature of the bedroom to reach 72 F or to drop to 66 F, etc.

In some embodiments, identification module 305 may identify a relative position and/or location of the occupant within the area at a predetermined time related to the wake up time. For example, identification module 305 may identify an occupant getting up in the middle of the night and/or may identify the occupants relative position relating to a room, an electronic device, and/or other occupants, among other things. For instance, identification module 305 may identify the occupant out of his/her bed before the wake up time and walking down a hallway towards a bathroom. In some cases, control module 310 may adjust a light based at least in part on a detected light level and the location of the occupant within the premises. For example, identification module 305 may measure a room's light level or luminance. Upon identifying the occupant out of bed before the wake up time, control module 310 may adjust a light by turning the light on and/or adjusting the brightness of the light based at least in part on a detected light level relative to the light. In some cases, the adjusted light may be in the bedroom, in an adjacent room or hallway, in a bathroom, etc. The control module 310 may select a particular light to adjust. For example, instead of adjusting an in-ceiling overhead light, the control module 310 may adjust a light configured for night-time operation such as an in-wall, down-facing light placed relatively near the floor. The control module 310 may turn on additional lights based on a determination of the occupant location, estimated route, and/or estimated destination, etc. In some cases, one or more in-wall lights may be integrated with a power outlet. The in-wall light may include a light emitting diode. The in-wall light may be dimmable. Thus, the control module 310 may adjust the light level of the light based on a predetermined brightness setting and/or based on a detected ambient light level.

In some embodiments, determination module 320 may determine whether the occupant performs one or more tasks. In some cases, communication module 325 may send a notification based at least in part on the determining. Upon determining the occupant is awake, monitoring module 315 may monitor the occupant to determine whether the occupant performs one or more tasks. For example, the determination module 320 may query the occupant whether he/she has finished an item on a morning task list or morning routine. Upon receiving an affirmative reply, smart wake module 215 may query the user whether he/she finished another item on the morning routine. Upon receiving a negative reply, determination module 320 may query the occupant for further information such as whether the occupant expects to finish the task, whether to postpone the task, whether the reschedule the task, and/or whether to cancel the task, etc. In some cases, communication module 325 may instruct the occupant to perform a first task then check up after a predetermined time to see whether the task is finished.

In some cases, monitoring module 315 may learn how long a task tends to take the occupant and then after lapsing the learned time communication module 325 may ask whether the occupant has finished this task. Upon determining the occupant has finished his/her first task (based on occupant feedback, automatic monitoring, assumptions based on received data, and/or assumptions based on elapsed time), communication module 325 may instruct the occupant to perform a second task, etc. Upon determination module 320 determining the occupant fails to perform at least one of the one or more tasks, communication module 325 may generate a notification. In some embodiments, the notification may be sent to a parent of a child. The notification may indicate that the occupant has failed to perform a particular task. The tasks that monitoring module 315 may monitor may include making a bed, brushing teeth, shaving, taking a shower, eating breakfast, gathering items, getting dressed for the day, etc.

In some embodiments, the communication module 325 may remind the occupant to perform one or more tasks. The communication module 325 may tell the occupant to perform tasks in a predetermined order. For example, the communication module 325 may tell the occupant to make his/her bed, eat breakfast, take a shower, brush his/her teeth, get dressed, etc. The communication module 325 may query the occupant to determine whether the occupant has performed a task. For example, the communication module 325 may ask "Have you brushed your teeth?" The occupant may reply in the affirmative and then the communication module 325 may tell the occupant to perform the next task such as make his/her lunch. In some cases, the monitoring module 315 may monitor image and/or audio signals to determine whether the occupant has performed a particular task. For example, the monitoring module 315 may analyze image, vibration, and/or audio signals to determine whether the occupant has made his or her bed.

Figure 4:
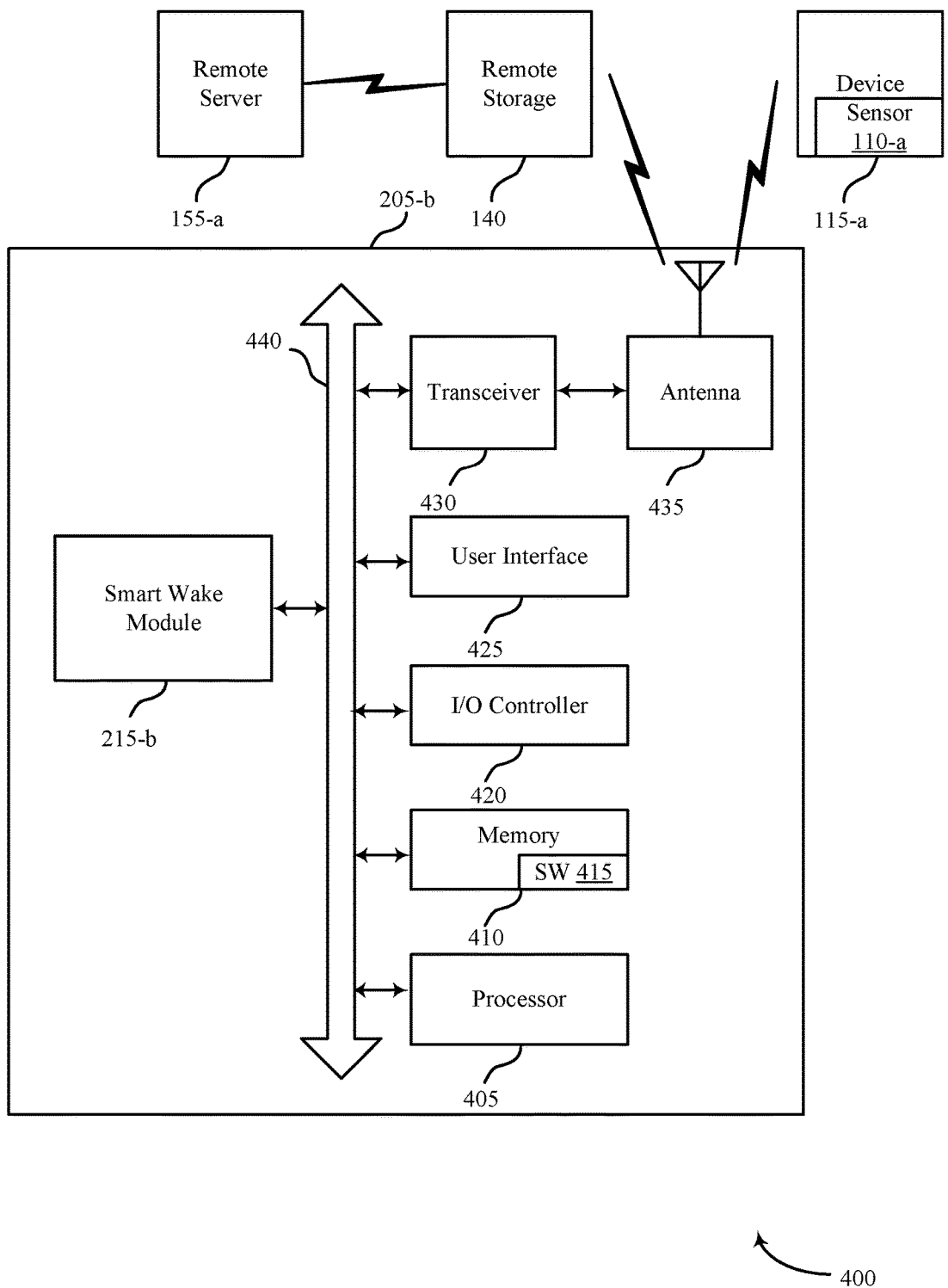
FIG. 4 shows a block diagram relating to a security and/or an automation system, in accordance with various aspects of this disclosure.

FIG. 4 shows a system 400 for use in automation systems, in accordance with various examples. System 400 may include an apparatus 205-b, which may be an example of the control panels 135 of FIG. 1. Apparatus 205-b may also be an example of one or more aspects of apparatus 205 and/or 205-a of FIGS. 2 and 3.

Apparatus 205-b may include components for bi-directional voice and data communications including components for transmitting communications and components for receiving communications. For example, apparatus 205-b may communicate bi-directionally with one or more of device 115-a, one or more sensors 110-a, remote computing device 140, and/or remote server 155-a, which may be an example of the remote server of FIG. 1. This bi-directional communication may be direct (e.g., apparatus 205-b communicating directly with remote computing device 140) and/or indirect (e.g., apparatus 205-b communicating indirectly with remote server 155-a through remote computing device 140).

Apparatus 205-b may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of device 115-a, remote computing device 140, and/or remote server 155-a. The transceiver module 430 may include a modem to modulate the packets and provide the modulated packets to the one or more antennas 435 for transmission, and to demodulate packets received from the one or more antennas 435, the control panel or the control device may also have multiple antennas 435 capable of concurrently transmitting or receiving multiple wired and/or wireless transmissions. In some embodiments, one element of apparatus 205-b (e.g., one or more antennas 435, transceiver module 430, etc.) may provide a direct connection to a remote server 155-a via a direct network link to the Internet via a POP (point of presence). In some embodiments, one element of apparatus 205-b (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 110-a (e.g., occupancy status, occupancy location, motion, proximity, smoke, light, glass break, door, audio, image, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-b (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., detect an occupant's progress in a wake-up routine and/or to determine whether to generate a notification based on the detected progress, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 can contain, among other things, the Basic Input-Output system (BIOS) which may control basic hardware and/or software operation such as the interaction with peripheral components or devices. For example, the smart wake module 215 to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the control panel or control device (e.g., 205-b) may include a single antenna 435, the control panel or control device (e.g., 205-b) may have multiple antennas 435 capable of concurrently transmitting and/or receiving multiple wireless transmissions. The apparatus 205-b may include a smart wake module 215-b, which may perform the functions described above for the smart wake module 215 of apparatus 205 of FIGS. 2 and 3.

Figure 5:
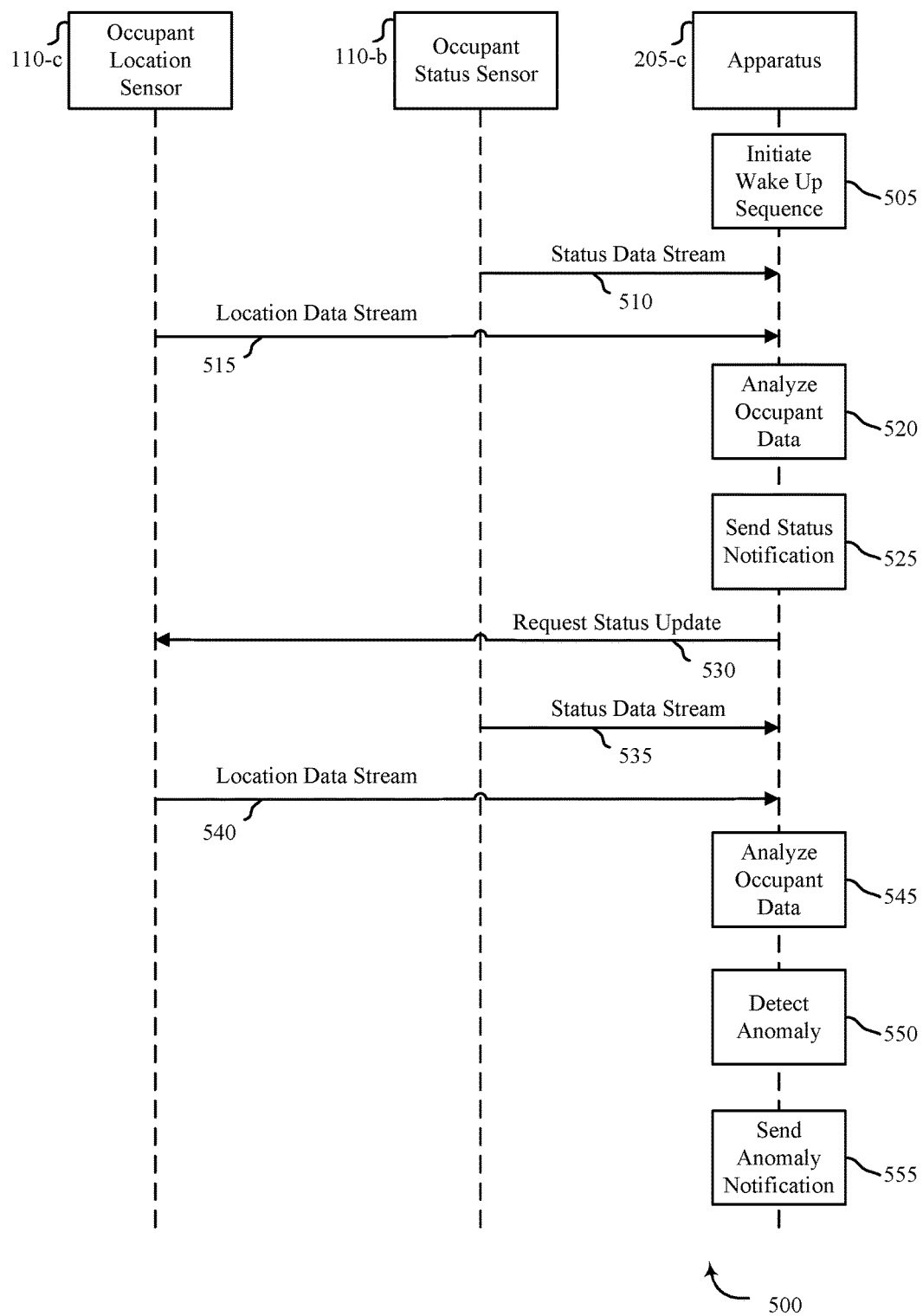
FIG. 5 shows a block diagram of a data flow relating to a security and/or an automation system, in accordance with various aspects of this disclosure.

FIG. 5 shows a block diagram of a data flow 500 relating to a security and/or an automation system, in accordance with various aspects of this disclosure. The data flow 500 illustrates the flow of data between an occupancy status sensor 110-b, an occupancy location sensor 110-c, and an apparatus 205-c. The occupancy status and/or location sensors 110 may be examples of one or more aspects of sensor 110 from FIGS. 1 and/or 4. Other additional and/or alternative sensors can be employed. Apparatus 205-c may be an example of one or more aspects of control panel 135 of FIG. 1, and/or apparatus 205 of FIGS. 2-4. In some cases, apparatus 205-c may include a computing device such as a smart phone, desktop, laptop, remote server (e.g., server 155 of FIG. 1). In some cases, apparatus 205-c may include a storage device and/or database. In some cases, one or more operations shown in FIG. 5 may be performed by another device, such as a remote server, using one or more communications connections.

At block 505, apparatus 205-c may initiate a wake up sequence. The wake up sequence may include sounding an audio alarm, adjusting one or more lights (e.g., turning a light on/off, adjusting brightness level, etc.), adjusting a temperature, turning on one or more appliances such as a coffee maker, turning on a shower to a user-designated temperature, starting a vehicle. In some cases, apparatus 205-c may perform one or more actions based on a detected progress of the occupant. For instance, upon detecting the occupant is finished taking a shower, apparatus 205-c may activate the coffee maker. In some cases, apparatus 205-c may perform one or more actions based on an outdoor temperature and/or an estimated departure time. For instance, if the outdoor temperature is within a predetermined range of 32 F (i.e., 0 degrees Celsius, or the freezing point), apparatus 205-c may start the vehicle 5 minutes before the occupant's estimated departure. On the other hand, if the outdoor temperature is 70 F, apparatus 205-c may start the vehicle 1 minute before the occupant's estimated departure. The audio alarm may include music, a radio station, an alarm tone, etc. The wake up sequence may include requesting data from one or more sensors such as the occupant sensors 110. Occupant status sensor 110-b may send status data stream 510 and/or occupant location sensor 110-c may send location data stream 515 to apparatus 205-c. Either or both of the sensors 110 may send this data upon request (e.g., in relation to initiating the wake up sequence at block 505) and/or may send this data continuously to apparatus 205-c.

At block 520, apparatus 205-c may analyze the occupant data, which may include status data stream 510 and/or location data stream 515. Thus, apparatus 205-c may determine whether the occupant is awake or sleeping, whether the occupant is in bed or out of his/her bed, whether the occupant is showered, dressed, eaten breakfast, etc. At block 525, apparatus 205-c may send a status notification. For example, the apparatus 205-c may analyze data related to a child and may send a notification to the parent regarding the child's progress in a morning routine.

In some embodiments, apparatus 205-c may send a status update request 530 to determine the progress of the occupant in his/her morning routine. In response to the request 530, occupant sensor 110-b may send a status data stream 535 to apparatus 205-c. Additionally, or alternatively, occupant location sensor 110-c may send location data stream 540 to apparatus 205-c. At block 545, apparatus 205-c may analyze the status data stream 535 and/or location data stream 540. At block 550, apparatus 205-c may detect an anomaly in the occupant's routine based on this analysis. For example, apparatus 205-c may determine the occupant is behind schedule. In some cases, apparatus 205-c may provide one or more suggestions (e.g., delivered over an in-wall speaker, via a control panel, via a smartphone, etc.) regarding how the occupant may make up time.

At block 555, apparatus 205-c may send an anomaly notification regarding the detected anomaly. For example, apparatus 205-c may determine that a child is behind his/her morning schedule. In some embodiments, apparatus 205-c may send a notification to the child's parent indicating that the child is running behind. In some cases, apparatus 205-c may determine that the child is likely feeling ill and may indicate this in the anomaly notification. In some cases, apparatus 205-c may omit, modify, reorder, and/or otherwise change a wake-time routine based on the delay to prioritize certain tasks based on limited time available. Or apparatus 205-c may query an occupant (the subject and/or another) to request that the occupant decide what actions should be prioritized and/or omitted.

Figure 6:
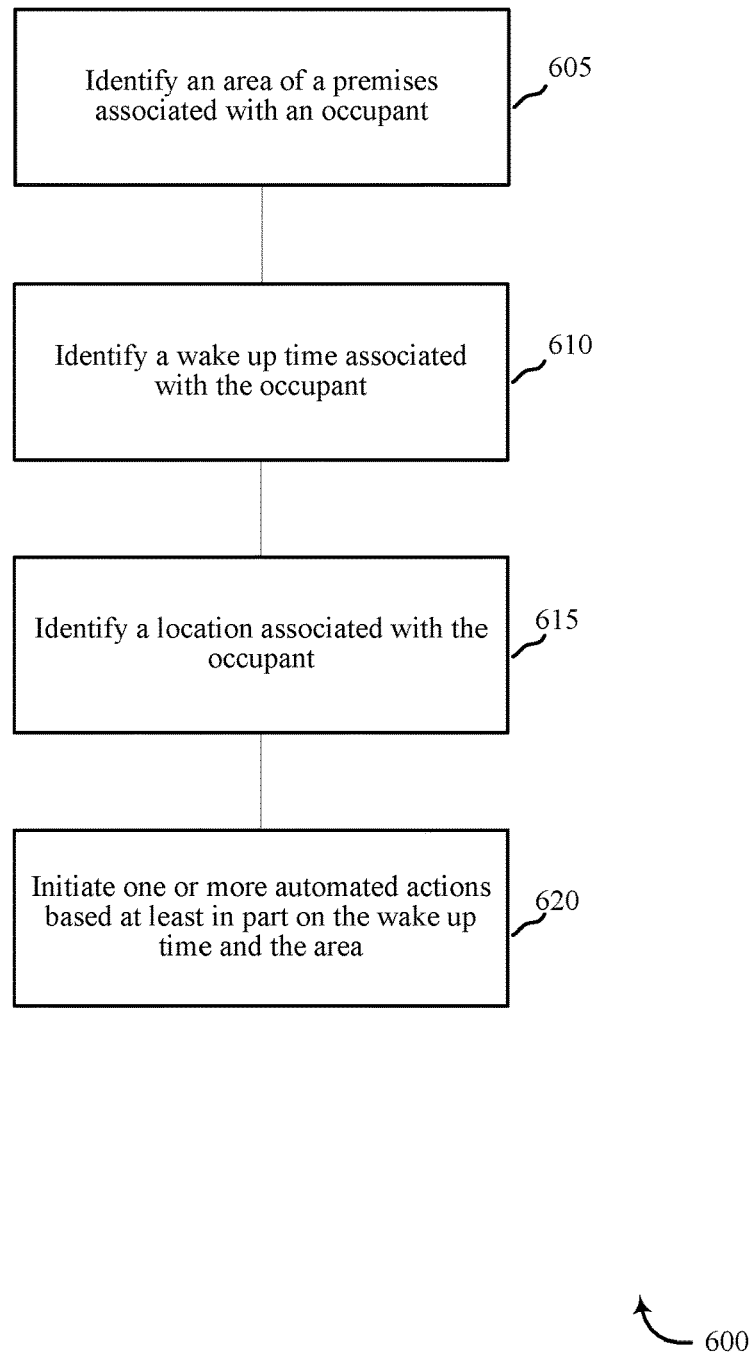
FIG. 6 is a flow chart illustrating an example of a method relating to a security and/or an automation system, in accordance with various aspects of this disclosure.

FIG. 6 is a flow chart illustrating an example of a method 600 for home automation, in accordance with various aspects of the present disclosure. For clarity, the method 600 is described below with reference to aspects of one or more of the sensor units 110 described with reference to FIGS. 1, 4, and/or 5. In some examples, a control panel, backend server, mobile computing device, and/or sensor may execute one or more sets of codes to control the functional elements of the control panel, backend server, mobile computing device, and/or sensor to perform one or more of the functions described below. Additionally or alternatively, the control panel, backend server, mobile computing device, and/or sensor may perform one or more of the functions described below using special-purpose hardware.

At block 605, an area of a premises associated with an occupant may be identified. The area may include a particular room of the premises such as a bedroom of the occupant. At block 610, a wake up time associated with the occupant may be identified. At block 615, a location associated with an occupant may be identified. In some embodiments, this location may be determined based on one or more sensors, actions performed, user data and/or feedback, and/or other information. At block 620, one or more automated actions may be initiated based at least in part on the wake up time and the area. The operation(s) at block 605-620 may be performed using the smart wake module 215 described with reference to FIGS. 2-4 and/or another module.

Thus, the method 600 may provide for monitoring progress in a morning routine relating to automation/security systems. It should be noted that the method 600 is just one implementation and that the operations of the method 600 may be rearranged, omitted, and/or otherwise modified such that other implementations are possible and contemplated.

Figure 7:
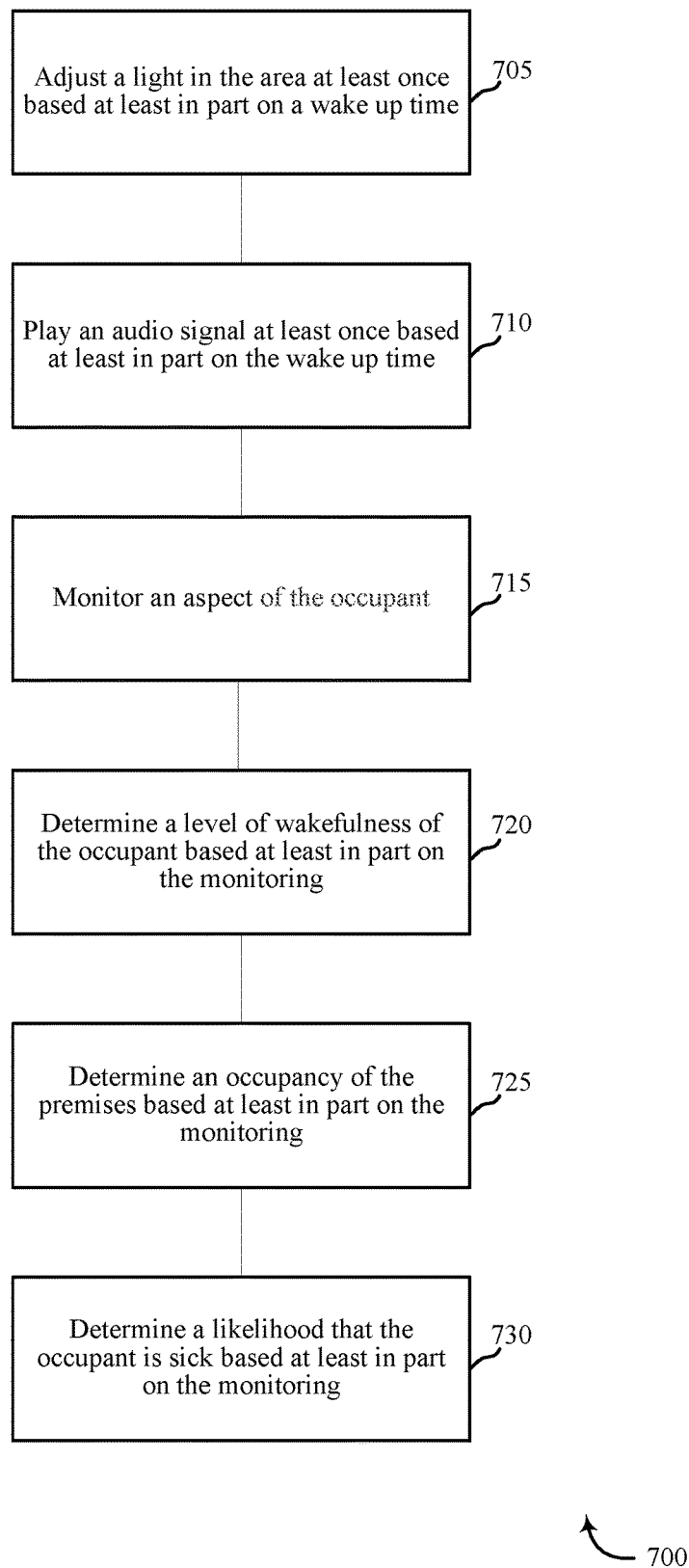
FIG. 7 is a flow chart illustrating an example of a method relating to a security and/or an automation system, in accordance with various aspects of this disclosure.

FIG. 7 is a flow chart illustrating an example of a method 700 for home automation, in accordance with various aspects of the present disclosure. For clarity, the method 700 is described below with reference to aspects of one or more of the sensor units 110 described with reference to FIGS. 1, 4, and/or 5. In some examples, a control panel, backend server, mobile computing device, and/or sensor may execute one or more sets of codes to control the functional elements of the control panel, backend server, mobile computing device, and/or sensor to perform one or more of the functions described below. Additionally or alternatively, the control panel, backend server, mobile computing device, and/or sensor may perform one or more of the functions described below using special-purpose hardware.

At block 705, a light in the area may be adjusted at least once based at least in part on a wake up time. At block 710, an audio signal may be played at least once based at least in part on the wake up time. At block 715, an aspect of the occupant may be monitored. In some cases, the monitoring may include monitoring at least one of a heart rate, or a respiratory rate, or a body temperature, or a rate of movement, or an audible sound, or a bed use status, and/or a combination thereof, among other things. At block 720, a level of wakefulness of the occupant may be determined based at least in part on the monitoring. At block 725, an occupancy of the premises may be determined based at least in part on the monitoring. At block 730, a likelihood that the occupant is sick may be determined based at least in part on the monitoring. In some embodiments, an environmental setting of the premises may be adjusted based at least in part on the monitoring. The operations at blocks 705-730 may be performed using the smart wake module 215 described with reference to FIGS. 2-4 and/or another module.

Thus, the method 700 may provide for monitoring progress in a morning routine relating to automation/security systems. It should be noted that the method 700 is just one implementation and that the operations of the method 700 may be rearranged, omitted, and/or otherwise modified such that other implementations are possible and contemplated.

Figure 8:
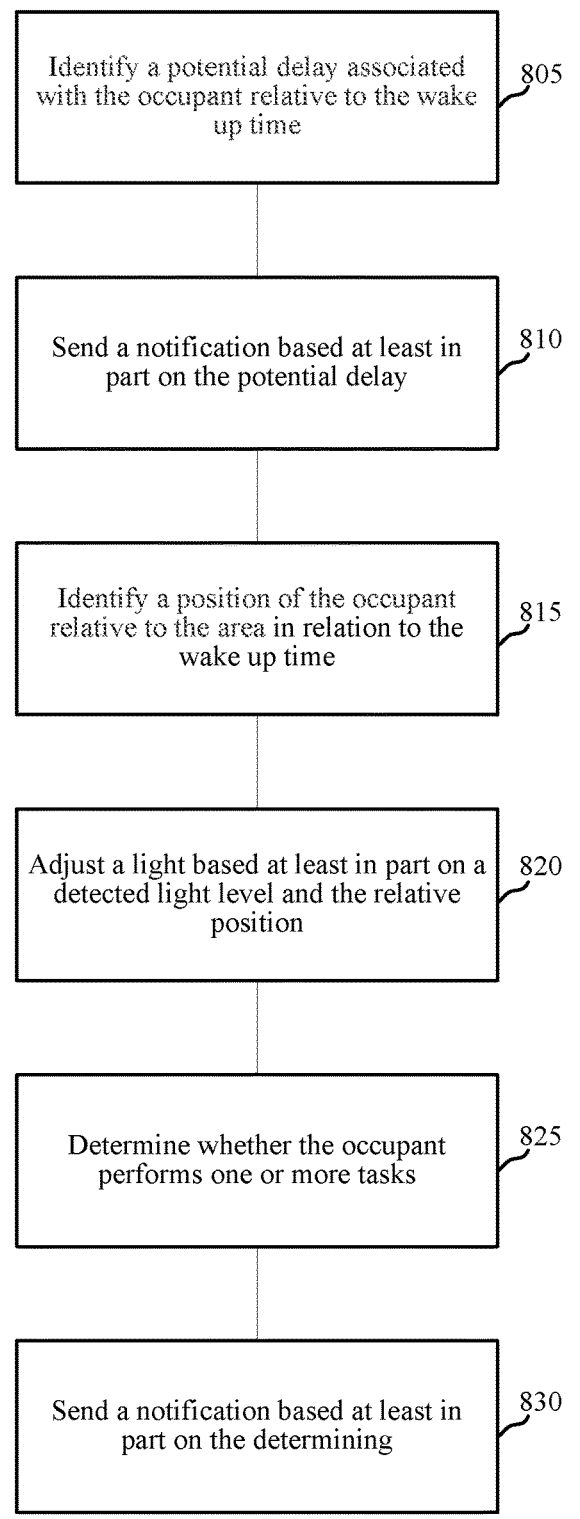
FIG. 8 is a flow chart illustrating an example of a method relating to a security and/or an automation system, in accordance with various aspects of this disclosure.

FIG. 8 is a flow chart illustrating an example of a method 800 for home automation, in accordance with various aspects of the present disclosure. For clarity, the method 800 is described below with reference to aspects of one or more of the sensor units 110 described with reference to FIGS. 1, 4, and/or 5. In some examples, a control panel, backend server, mobile computing device, and/or sensor may execute one or more sets of codes to control the functional elements of the control panel, backend server, mobile computing device, and/or sensor to perform one or more of the functions described below. Additionally or alternatively, the control panel, backend server, mobile computing device, and/or sensor may perform one or more of the functions described below using special-purpose hardware.

At block 805, a potential delay associated with the occupant may be identified relative to the wake up time. At block 810, a notification may be sent based at least in part on the potential delay. At block 815, a position of the occupant relative to the area may be identified in relation to the wake up time. At block 820, a light may be adjusted based at least in part on a detected light level and the relative position. At block 825, whether the occupant performs one or more tasks may be determined. At block 830, a notification may be sent based at least in part on the determining. The operations at blocks 805-830 may be performed using the smart wake module 215 described with reference to FIGS. 2-4 and/or another module.

Thus, the method 800 may provide for monitoring progress in a morning routine relating to automation/security systems. It should be noted that the method 800 is just one implementation and that the operations of the method 800 may be rearranged, omitted, and/or otherwise modified such that other implementations are possible and contemplated.

In some examples, aspects from two or more of the methods 600, 700, and 800 may be combined and/or separated. It should be noted that the methods 600, 700, and 800 are just example implementations, and that the operations of the methods 600, 700, and 800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for an automation system, comprising:
identifying an area of a premises associated with an occupant;
identifying a wake up time associated with the occupant;
identifying a location associated with the occupant;
determining a status of the occupant at a designated time after the wake up time; and
providing a prompt in a notification output regarding the status of the occupant, wherein the prompt allows a recipient of the notification output to activate an alarm.

2. The method of claim 1, further comprising:
initiating one or more automated actions based at least in part on the wake up time and the area.

3. The method of claim 1, further comprising:
receiving a response to the prompt in the notification output to activate the alarm; and
activating the alarm for the occupant based on receiving the response to the prompt.

4. The method of claim 1, further comprising:
monitoring an aspect of the occupant, wherein the monitoring includes monitoring at least one of a heart rate, or a respiratory rate, or a body temperature, or a rate of movement, or an audible sound, or a bed use status, or a combination thereof, wherein the status of the occupant is based on the one or more monitored aspects of the occupant.

5. The method of claim 4, wherein determining the status of the occupant further comprises:
determining a level of wakefulness of the occupant based at least in part on the monitoring.

6. The method of claim 1, wherein identifying the wake up time further comprises:
determining an alarm time associated with an electronic device associated with the occupant.

7. The method of claim 1, wherein identifying the wake up time further comprises:
determining the wake up time for the occupant based at least in part on an appointment in an electronic calendar associated with the occupant.

8. The method of claim 7, further comprising:
identifying a potential delay associated with the occupant relative to the wake up time, wherein the notification output indicates at least in part the potential delay.

9. The method of claim 1, further comprising:
identifying a position of the occupant relative to the area of the premises in relation to the wake up time; and
adjusting a light based at least in part on a detected light level and the location associated with the occupant.

10. The method of claim 1, further comprising:
determining whether the occupant has performed one or more tasks, wherein the notification output indicates which of the one or more tasks the occupant has performed.

11. An apparatus for an automation system, comprising:
a processor;
memory in electronic communication with the processor; and
instructions stored in the memory, the instructions being executable by the processor to:
identify an area of a premises associated with an occupant;
identify a wake up time associated with the occupant;
identify a location associated with the occupant; and
determine a status of the occupant at a designated time after the wake up time; and provide a prompt in a notification output regarding the status of the occupant, wherein the prompt allows a recipient of the notification output to activate an alarm.

12. The apparatus of claim 11, the instructions being executable by the processor to:
initiate one or more automated actions based at least in part on the wake up time and the area.

13. The apparatus of claim 12, the instructions being executable by the processor to:
receive a response to the prompt in the notification to activate the alarm; and
activate the alarm for the occupant based on receiving the response to the prompt.

14. The apparatus of claim 11, the instructions being executable by the processor to:
monitor an aspect of the occupant, wherein the monitoring includes monitoring at least one of a heart rate, or a respiratory rate, or a body temperature, or a rate of movement, or an audible sound, or a bed use status, or a combination thereof, wherein the status of the occupant is based on the one or more monitored aspects of the occupant.

15. The apparatus of claim 11, wherein the instructions to identify the wake up time further comprises:
determine an alarm time associated with an electronic device associated with the occupant.

16. The apparatus of claim 11, wherein the instructions to identify the wake up time further comprises:
determine the wake up time for the occupant based at least in part on an appointment in an electronic calendar associated with the occupant.

17. The apparatus of claim 16, the instructions being executable by the processor to:
identify a potential delay associated with the occupant relative to the wake up time, wherein the notification output indicates at least in part the potential delay.

18. The apparatus of claim 11, the instructions being executable by the processor to:
determine whether the occupant has performed one or more tasks, wherein the notification output indicates which of the one or more tasks the occupant has performed.

19. A non-transitory computer-readable medium storing computer-executable code for an automation system, the code executable by a processor to:
identify an area of a premises associated with an occupant;
identify a wake up time associated with the occupant;
identify a location associated with the occupant; and
determine a status of the occupant at a designated time after the wake up time; and
provide a prompt in a notification output regarding the status of the occupant, wherein the prompt allows a recipient of the notification output to activate an alarm.

20. The non-transitory computer-readable medium of claim 19, wherein the code is further executable by the processor to:
receive a response to the prompt in the notification to activate the alarm; and
activate the alarm for the occupant based on receiving the response to the prompt.

* * * * *